United States Patent
Damnjanovic et al.

(10) Patent No.: US 9,369,990 B2
(45) Date of Patent: Jun. 14, 2016

(54) MULTI-CARRIER DESIGN FOR CONTROL AND PROCEDURES

(75) Inventors: Jelena M. Damnjanovic, Del Mar, CA (US); Juan Montojo, San Diego, CA (US); Sandip Sarkar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 902 days.

(21) Appl. No.: 12/537,698

(22) Filed: Aug. 7, 2009

(65) Prior Publication Data

US 2010/0035625 A1 Feb. 11, 2010

Related U.S. Application Data

(60) Provisional application No. 61/087,959, filed on Aug. 11, 2008, provisional application No. 61/088,321, filed on Aug. 12, 2008.

(51) Int. Cl.
*H04W 4/00* (2009.01)
*H04B 7/212* (2006.01)
*H04W 72/00* (2009.01)

(52) U.S. Cl.
CPC ................... *H04W 72/00* (2013.01)

(58) Field of Classification Search
CPC .................................................. H04W 72/00
USPC ........................................................ 370/329
See application file for complete search history.

(56) References Cited

U.S. PATENT DOCUMENTS

| | | | |
|---|---|---|---|
| 7,953,048 B2* | 5/2011 | Yoon et al. | 370/335 |
| 8,169,953 B2 | 5/2012 | Damnjanovic et al. | |
| 8,358,630 B2* | 1/2013 | Kim et al. | 370/352 |
| 8,797,977 B2* | 8/2014 | Aiba | H04L 1/0026 370/252 |
| 2002/0164986 A1* | 11/2002 | Briand | H04B 7/2618 455/442 |
| 2003/0109284 A1* | 6/2003 | Akerberg et al. | 455/561 |
| 2004/0066970 A1 | 4/2004 | Matsugu | |
| 2004/0180666 A1* | 9/2004 | Wenger et al. | 455/450 |
| 2005/0176371 A1* | 8/2005 | Palin et al. | 455/41.2 |
| 2006/0013181 A1 | 1/2006 | Stolpman et al. | |

(Continued)

FOREIGN PATENT DOCUMENTS

CN 101204050 6/2008
JP 2008539667 A 11/2008

(Continued)

OTHER PUBLICATIONS

"Fujitsu: "Anchor component carrier" 3GPP Draft; R1-090382, 3rd Generation Partnership Project (3GPP), Mobile Competence Centre; 650, Route Des Lucioles; F-06921 Sophia-Antipolis Cedex; France, no. Ljubljana; 20090108, Jan. 12, 2008, XP050318283 [retrieved on Jan. 8, 2009]".

(Continued)

*Primary Examiner* — Gerald Smarth
(74) *Attorney, Agent, or Firm* — Paul Kuo (57) ABSTRACT

A method, an apparatus, and a computer program product operable in a wireless communication system are provided in which a pairing is determined between one or more uplink carriers and one or more downlink carriers. The one or more uplink carriers and the one or more downlink carriers include at least three carriers. On which carrier to exchange control information on one or more of the carriers is based on the pairing or an anchor carrier designation.

32 Claims, 6 Drawing Sheets

(56) References Cited

U.S. PATENT DOCUMENTS

| | | | |
|---|---|---|---|
| 2006/0013182 A1* | 1/2006 | Balasubramanian et al. | 370/343 |
| 2006/0024712 A1 | 2/2006 | Baker et al. | |
| 2006/0073849 A1* | 4/2006 | Kuriki et al. ................. | 455/560 |
| 2006/0274712 A1* | 12/2006 | Malladi et al. ................ | 370/345 |
| 2006/0274777 A1* | 12/2006 | Fujii et al. .................... | 370/445 |
| 2007/0053383 A1* | 3/2007 | Choi et al. .................... | 370/469 |
| 2007/0201437 A1* | 8/2007 | Kim et al. ..................... | 370/352 |
| 2007/0265015 A1* | 11/2007 | Lagerman .................. | 455/452.1 |
| 2009/0012934 A1 | 1/2009 | Yerigan | |
| 2009/0129334 A1* | 5/2009 | Ma et al. ....................... | 370/331 |
| 2010/0297990 A1* | 11/2010 | Le Pezennec et al. ..... | 455/422.1 |

FOREIGN PATENT DOCUMENTS

| | | |
|---|---|---|
| WO | WO2005086447 A1 | 9/2005 |
| WO | 2006116102 A2 | 11/2006 |
| WO | WO-2006125149 A2 | 11/2006 |
| WO | WO2009120125 A1 | 10/2009 |

OTHER PUBLICATIONS

International Search Report and Written Opinion—PCT/US2009/053317, International Search Authority—European Patent Office—Nov. 25, 2009.

Taiwan Search Report—TW098126995—TIPO—Jan. 2, 2013.

Ericsson: "A discussion on some technology components for LTE-Advanced", 3GPP TSG-RAN WG1#53 R1-082024, May 5, 2008.

Ericsson: "Carrier aggregation in LTE-Advanced", 3GPP TSG-RAN WG1#53b R1-082468, Jun. 30, 2008.

ZTE Corporation: "Technical points for LTE-advanced", 3GPP TSG-RAN WG1#53 R1-081773, May 2008.

* cited by examiner

MULTI-CARRIER DESIGN FOR CONTROL AND PROCEDURES

CROSS-REFERENCE TO RELATED APPLICATION(S)

Pursuant to 35 U.S.C. §119(e), this application claims the benefit of U.S. Provisional Application Ser. No. 61/087,959 filed on Aug. 11, 2008, and the benefit of U.S. Provisional Application Ser. No. 61/088,321 filed on Aug. 12, 2008, the contents of which are hereby incorporated by reference herein in their entirety.

BACKGROUND

1. Field

The present disclosure relates generally to communications, and more particularly, to multi-carrier design for control and procedures.

2. Background

Wireless communication systems are widely deployed to provide various telecommunication services such as telephony, video, data, messaging, and broadcasts. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Wireless communication systems are generally designed to provide wireless access to a network (e.g., the Internet) for multiple mobile stations within a geographic region. Access is provided by an access point or base station serving the geographic region. A base station is an apparatus having a radio transceiver to support a wireless access protocol (i.e., radio-based communication link) with multiple mobile stations. The wireless access protocol is generally defined by an industry standard that includes, among other things, the multiple-access system used by the base station to communicate with the mobile stations.

SUMMARY

In an aspect of the disclosure, a method used in a wireless communication system is provided in which a pairing is determined between one or more uplink carriers and one or more downlink carriers. The one or more uplink carriers and the one or more downlink carriers include at least three carriers. On which carrier to exchange control information on one or more of the carriers is based on the pairing or an anchor carrier designation.

In another aspect of the disclosure, an apparatus operable in a wireless communication system includes means for determining a pairing between one or more uplink carriers and one or more downlink carriers. The one or more uplink carriers and the one or more downlink carriers include at least three carriers. The apparatus further includes means for exchanging control information on one or more of the carriers based on the pairing or an anchor carrier designation.

In another aspect of the disclosure, an apparatus operable in a wireless communication system includes a processing system. The processing system is configured to determine a pairing between one or more uplink carriers and one or more downlink carriers. The one or more uplink carriers and the one or more downlink carriers include at least three carriers. The processing system is further configured to exchange control information on one or more of the carriers based on the pairing or an anchor carrier designation.

In another aspect of the disclosure, a computer program product is provided. The computer program product has code for determining a pairing between one or more uplink carriers and one or more downlink carriers. The one or more uplink carriers and the one or more downlink carriers include at least three carriers. The computer program product also has code for exchanging control information on one or more of the carriers based on the pairing or an anchor carrier designation.

DETAILED DESCRIPTION

Various aspects of the invention are described more fully hereinafter with reference to the accompanying drawings. This invention may, however, be embodied in many different forms and should not be construed as limited to any specific structure or function presented in this disclosure. Rather, these aspects are provided so that this disclosure will be thorough and complete, and will fully convey the scope of the invention to those skilled in the art.

The detail description may include specific details to illustrate various aspects of the invention. However, it will be apparent to those skilled in the art that the invention may be practiced without these specific details. In some instances, well known elements may be shown in block diagram form, or omitted, to avoid obscuring the inventive concepts presented throughout this disclosure.

Figure 1:
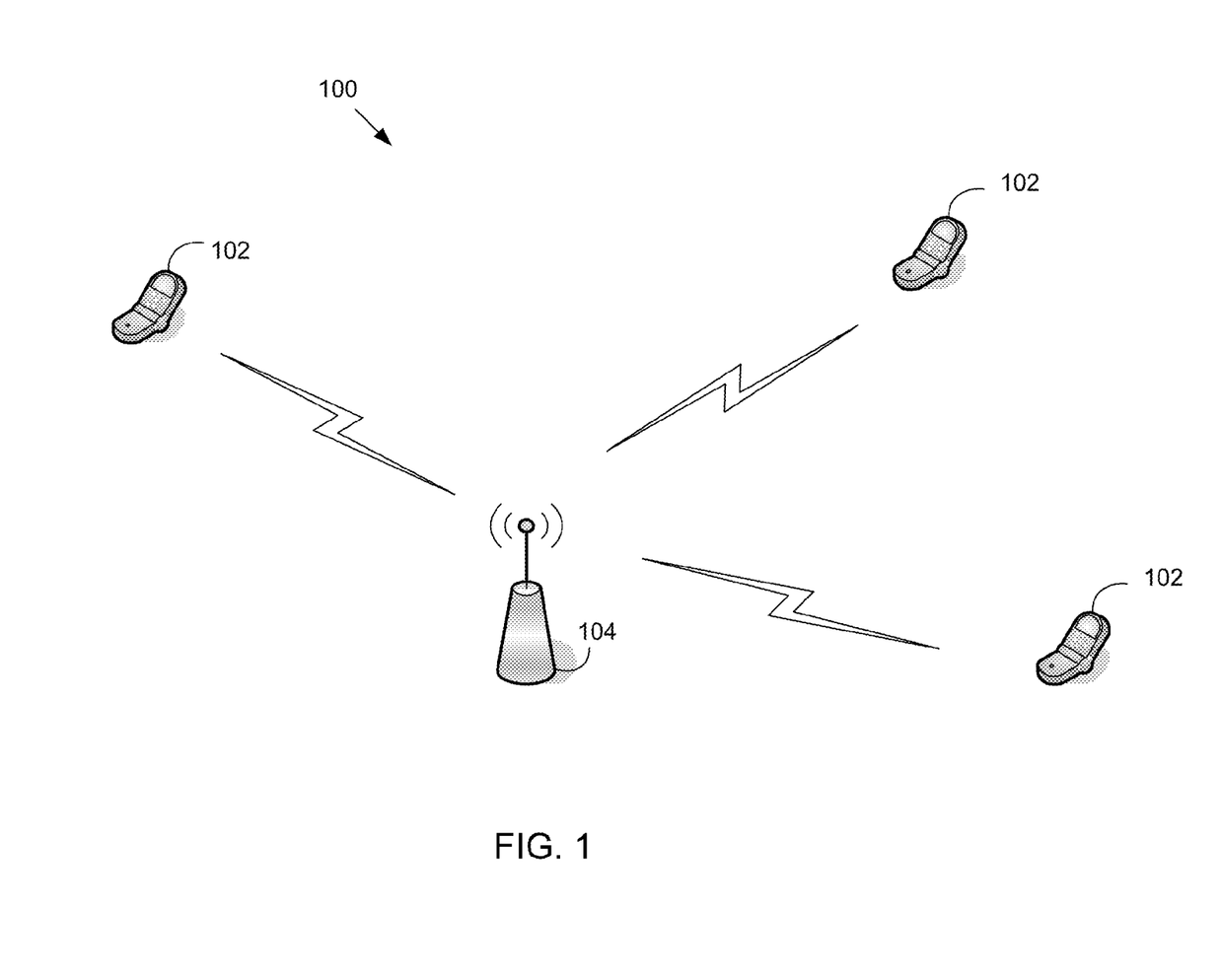
FIG. 1 is a conceptual diagram illustrating an example of a wireless communications system.

Several aspects of a wireless communications system will now be presented with reference to FIG. 1. The wireless communications system 100 may support any number of apparatuses. An apparatus may be an eNodeB or user equipment (UE). In FIG. 1, the wireless system 100 is shown with several UEs 102 in communication with an eNodeB (i.e., base station) 104. The UEs 102 are shown as are cellular phones, but may be cordless phones, smart phones, session initiation protocol (SIP) phones, laptops, personal digital assistants (PDAs), satellite radios, global positioning systems, multimedia devices, video devices, digital audio players (e.g., MP3 player), cameras, game consoles, or any other suitable device having wireless connection capability. A UE 102 may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The eNodeB 104 may be referred to as a base station, a base transceiver station, a radio base station, an access point, NodeB, a transceiver function, a radio router, a radio transceiver, a basic service set (BSS), an extended service set (ESS), or some other suitable terminology. The various concepts presented throughout this disclosure are intended to apply to all suitable entities regardless of their specific nomenclature.

The wireless communication system may be configured to support Long Term Evolution (LTE), which is a set of enhancements to the Universal Mobile Telecommunications System (UMTS) mobile phone standard in order to improve spectral efficiency, lower costs, improve services, make use of new spectrum, and better integrate with other open standards.

However, as those skilled in the art will readily appreciate, the various concepts presented throughout this disclosure may be extended to other suitable wireless technology and/or air interface standard. By way of example, the wireless communication system may be an IEEE 802.11 system supporting OFDM communication, an IS-2000, IS-95, IS-856, or wideband-CDMA (WCDMA) supporting CDMA communication, or a Global System for Mobile Communication (GSM) supporting TDMA communication.

Figure 2:
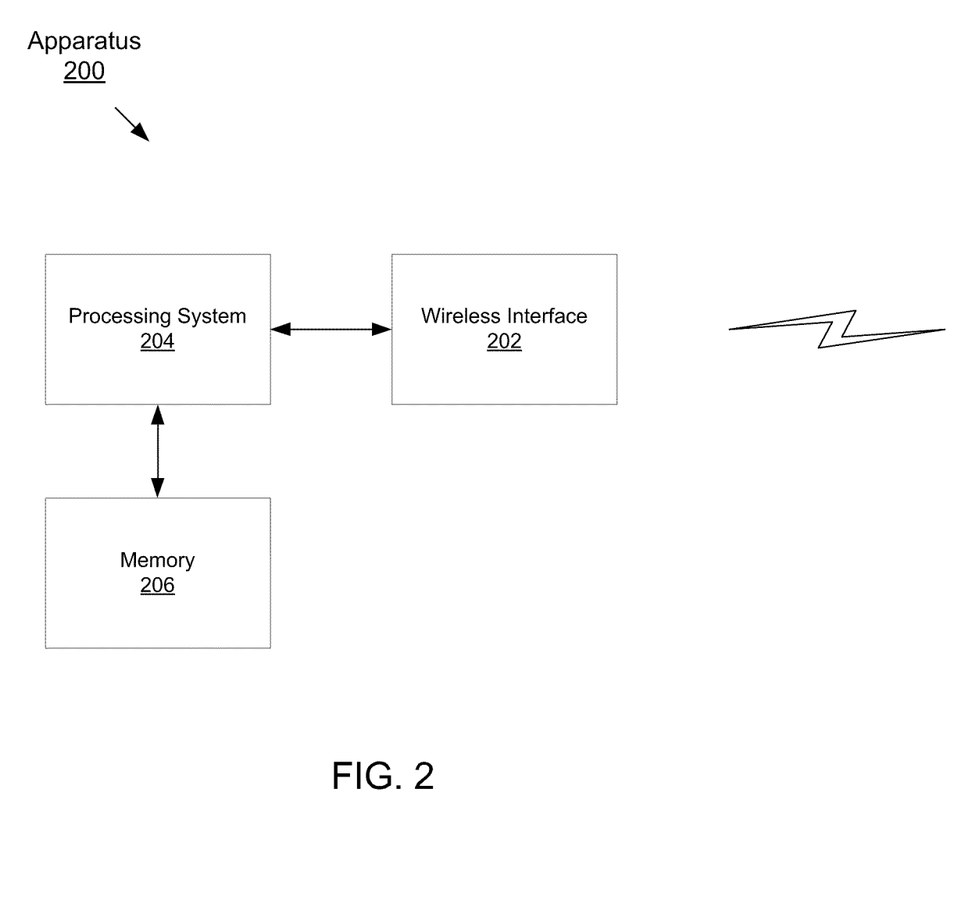
FIG. 2 is a block diagram illustrating a hardware configuration for an apparatus.

FIG. 2 is a conceptual block diagram illustrating a hardware configuration for an apparatus 200, which can be a UE 102 or an eNodeB 104. The apparatus 200 may include a wireless interface 202, a processing system 204, and a machine-readable medium 206. The wireless interface 202 includes one or more antennas and may include a transceiver to support two-way communications over the wireless medium. Alternatively, the wireless interface 202 may include a transmitter or a receiver to support one-way communications. In the detailed description that follows, the wireless interface 202 may be described as a transmitter or a receiver to illustrate a particular aspect of the invention. Such a reference does not imply that the wireless interface 202 is incapable of performing both transmit and receive operations.

The wireless interface 202 may be integrated into the processing system 204 or distributed across multiple entities in the apparatus. The wireless interface 202 and the processing system 204 may support the Evolved UMTS Terrestrial Radio Access (E-UTRA) air interface. E-UTRA is the air interface of 3GPP's LTE upgrade path for mobile networks. E-UTRA uses orthogonal frequency-division multiplexing (OFDM) and multiple-input multiple-output (MIMO) antenna technology to support more users and higher data rates.

The processing system 204 may be implemented with one or more processors. The one or more processors may be implemented with any combination of general-purpose microprocessors, microcontrollers, digital signal processors (DSPs), field programmable gate array (FPGAs), programmable logic devices (PLDs), controllers, integrated circuits, state machines, gated logic, discrete hardware components, or any other suitable entities that can perform calculations or other manipulations of information.

The processing system 204 is coupled to machine-readable media 206 for storing software. Alternatively, the processing system 204 may itself include the machine-readable media 206. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 204 to perform the various functions described below, as well as various protocol processing functions.

The machine-readable media 206 may be random access memory (RAM), a flash memory, a read only memory (ROM), a programmable ROM (PROM), an erasable PROM (EPROM), registers, a hard disk, a removable disk, a CD-ROM, a DVD, a carrier wave, a transmission line, any other suitable storage device, or any other apparatus or means through which the instructions may be transmitted.

The apparatus 200 is configured to operate on a perforated spectrum, and therefore supports disjoint (i.e., noncontiguous) downlink (DL) and uplink (UL) frequency allocations and asymmetric DL/UL bandwidths, and can transmit on disjoint frequency allocations (i.e., carriers) at a given time. One of more of the carriers may be disjoint and/or have asymmetric bandwidth as compared to the other of the carriers. Whether the carriers have asymmetric bandwidth may depend on the traffic demands for the UL and the DL. UEs with lower traffic demand or with a need to conserve battery power may utilize a DL carrier with a bandwidth of 5 MHz, while UEs with a higher traffic demand may utilize multiple DL carriers with larger bandwidths.

The apparatus 200 supports multi-segment operation on DL and UL in which multiple carriers are segmented within a particular bandwidth such that the multiple carriers have contiguous frequency allocations. The apparatus 200 may enable low battery consumption through confining control and data transmission for a low data rate within a narrow band (e.g., 5 MHz), and provides backward compatibility with legacy systems, such as for example, LTE Release 8.

The DL transmission scheme for LTE systems is OFDMA based. The UL scheme may be OFDMA, SC-FDMA, or an OFDMA/SC-FDMA hybrid with the possibility for switching between OFDMA and SC-FDMA in order to provide backward compatibility for single carrier assignment.

The apparatus 200 is further configured to support carrier pairing between the DL and UL carriers. The pairing can be between one or more DL carriers and one or more UL carriers. In one configuration, at least one DL carrier is paired with a plurality of UL carriers or a plurality of DL carriers are paired with at least one UL carrier, such that the pairing group of DL and UL carriers contains at least three carriers.

Figure 3:
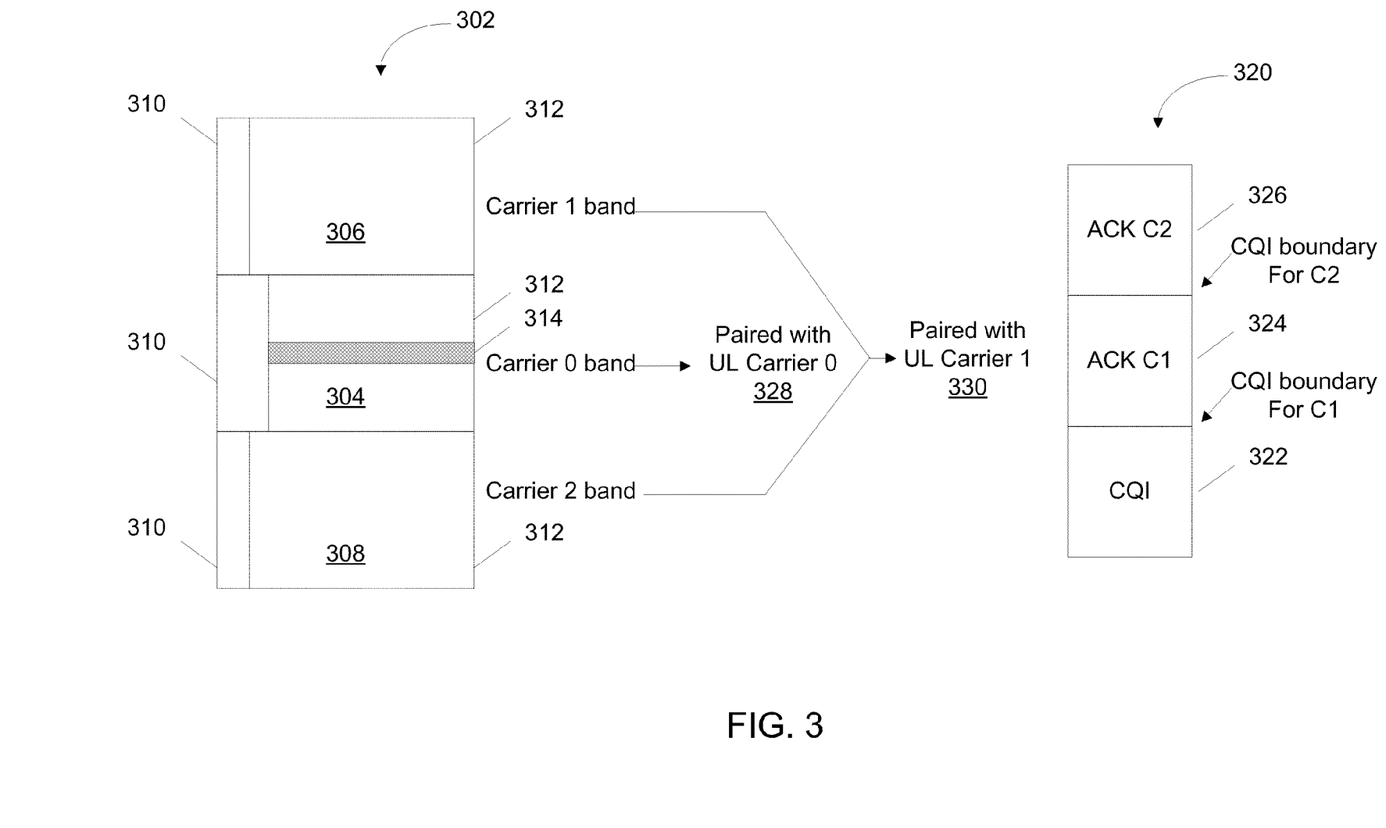
FIG. 3 is a diagram illustrating uplink/downlink pairing.

FIG. 3 is a block diagram illustrating an example of DL/UL carrier pairing for the apparatus 200. FIG. 3 shows one transmission time interval (TTI) 302 for three DL carriers, carrier 0 band 304, carrier 1 band 306, and carrier 2 band 308. Each of the DL carriers includes a legacy control portion 310 and a payload portion 312. Carrier 0 band 304 also includes a multicarrier control region 314 in the payload portion.

In FIG. 3, carrier 0 band 304 is paired with one UL carrier 0 (328) and carrier 1 band 306 and carrier 2 band 308 are both paired to a second UL carrier 2 (330). FIG. 3 illustrates a mapping 320 of channel quality indication (CQI) feedback and acknowledgment (ACK/NACK) messages communicated in the UL carrier 1 (330) that is paired with the two DL carriers, carrier 1 band 306 and carrier 2 band 308. As shown in FIG. 3, the UL carrier 1 (330) shared by the two DL carriers receives CQI feedback 322 and ACK 324 for DL carrier 1 and DL carrier 2 separated into different frequency bands of the UL carrier 1 (330). The ACK 324 for DL carrier 1 begins at the CQI boundary and the ACK 326 for DL carrier 2 is mapped to begin at a boundary mapped to the end of the ACK for carrier 1, designated as CQI boundary for C2.

As shown in FIG. 3, the UL carrier 1 (330) is paired with two DL carriers 306, 308; and the UL carrier 0 (328) is paired with the DL carrier 304. UL carrier 0 (328) receives control information for DL carrier 304 and UL carrier 1 (33) receives UL control information for DL carriers 306, 308. The UL control information may include CQI feedback and DL hybrid automatic repeat request (HARQ) ACK/NACK feedback. Similarly, the DL carrier 304 receives DL control information for UL carrier 0 (328) and DL carriers 306, 308 receive DL control information for UL carrier 1 (330). The DL control information includes UL HARQ feedback, UL grants, and DL grants.

Carrier pairing can be semi-static or dynamic as determined by the eNodeB 104. For semi-static pairing, the eNodeB 104 can notify all the UEs of the pairing by broadcasting the system information in a system information block (SIB). Alternatively, the eNodeB 104 can inform each UE 102 of the pairing with a dedicated signaling through radio resource control (RRC) signaling in the RRC connection setup message. For dynamic pairing, the eNodeB 104 can notify the UEs 102 of the pairing through media access control (MAC) signaling included in the grant message.

Figure 4:
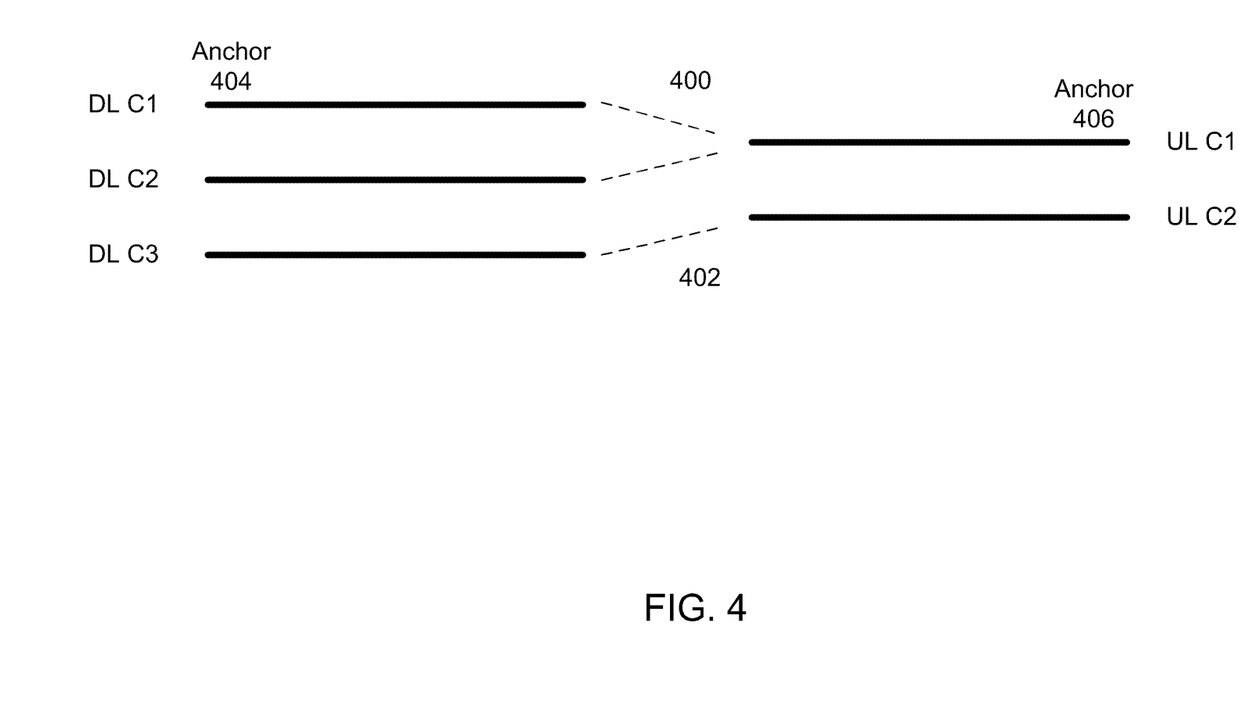
FIG. 4 is a diagram illustrating uplink/downlink pairing with anchor carriers.

FIG. 4 is a diagram illustrating uplink/downlink pairing with anchor carriers for the apparatus 200. As shown in FIG. 4, DL carrier 1 (DL C1) and DL carrier 2 (DL C2) are paired (400) with UL carrier 1 (UL C1) and DL carrier 3 (DL C3) is paired (402) with UL carrier 2 (UL C2). As discussed supra, on which carrier control information is sent may be based on the pairing. Alternatively, on which carrier control information is sent may be based on whether there are designated anchor carriers. When based on pairing, UL C1 receives control information for DL C1 and DL C2, DL C1 and DL C2 receive control information for UL C1, UL C2 receives control information for DL C3, and DL C3 receives control information for UL C2. When based on whether there are designated anchor carriers, control information is sent on the anchor carriers for one or more of the corresponding carriers, even if the carriers are outside the pairing. For example, if DL C1 is designated as the anchor carrier (404) for DL carriers C1, C2, and C3 and UL C1 is designated as the anchor carrier (406) for UL carriers C1 and C2, then UL C1 would receive control information for DL carriers C1, C2, and C3, and DL C1 would receive control information for UL carriers C1 and C2.

One or more anchor carriers can be defined for each of the uplink carriers and the downlink carriers. The transmission of control information in uplink and downlink is based on the designated pairing or the designated anchors for each of the uplink and downlink carriers. The eNodeB 104 decides the pairing and communicates the pairing to UEs 102 with which the eNodeB 104 is in communication. The eNodeB 104 may communicate the pairing through a system-information broadcast to all UEs 102 or through dedicated signaling to each UE 102. The UE 102 receives pairing information from the eNodeB 104 and identifies the pairing from the broadcast or dedicated signaling.

As described with respect to FIG. 4, when there is an anchor carrier, control information for multiple DL carriers may be conveyed on one UL carrier (a UL anchor carrier). The UL anchor carrier on which control information for particular DL carriers is conveyed is not necessarily the UL carrier with which the particular DL carriers are paired. The eNodeB 104 may notify the UEs 102 of an anchor carrier in an SIB or through a dedicated signaling such as RRC signaling. The eNodeB 104 notifies UEs 102 of the UL/DL pairing and any anchor carriers in SIBs. The SIBs may include carrier locations (i.e., carrier center frequencies), carrier bandwidths, carrier designation (UL/DL), carrier pairing, and anchor carrier information. In one configuration, some of the control information may be sent through the anchor carrier and other control information may be sent through the paired carrier. For example, the eNodeB 104 could indicate with a flag through a broadcast or RRC signaling that CQI feedback and/or DL HARQ feedback be sent on a paired UL carrier rather than the designated UL anchor carrier.

UL HARQ feedback on DL may come on the DL carrier on which the UL grant was sent. For multicarrier grants, HARQ feedbacks for different UL carriers may be sent on the anchor carrier where the grant was sent. Resource mapping needs may be adjusted such that ACKs for different carriers are distinguished. In one configuration, a flag may indicate that the HARQ feedback is sent on the DL carrier paired with the UL carrier on which the transmission occurred, and not necessarily on the carrier where the grant was sent. As discussed supra, the system information may be conveyed through a broadcast or a dedicated signaling such as RRC signaling. If data is jointly coded across multiple UL carriers used for data transmission to a UE 102, there could be one corresponding HARQ feedback mapped on the anchor carrier on which the DL grant (for all UL carriers to be used for UL transmission of a UE) was sent, or there could be multiple repeated HARQ feedbacks mapped on the DL carriers corresponding to the paired UL carriers where the UL transmissions occurred.

DL HARQ feedback on UL may come on the UL carrier paired with the DL carrier on which the grant was sent. For multicarrier grants, the HARQ feedbacks for different DL carriers may be sent on the UL carrier paired with the DL anchor carrier on which the grant was sent. Resource mapping may allow ACKs for different carriers to be distinguished. Multiple DL carriers may be mapped to one UL carrier. For SC-FDMA, an appropriate CQI feedback space shift may be used to compensate for the resources used by HARQ feedback for other DL carriers paired with the same UL carrier. CQI feedback for all DL carriers may be sent on the block designated for the feedback in the RRC signaling.

In addition to control information, the anchor carrier may also carry system information and data. An anchor carrier may be defined for a subset of the carriers. The subset may include all the carriers or may be a proper subset and include less than all the carriers. As such, multiple anchor carriers may be defined for a set of carriers and there may be several anchor carriers for different groups of carriers. If an anchor carrier is defined for just one carrier, the anchor carrier acts as a regular carrier. For example, if an UL carrier is the anchor carrier for one DL carrier, the UL anchor carrier will act as a regular carrier for the one DL carrier, as that UL carrier will not receive information (i.e., system information, control information, data) for any other DL carriers.

Non-anchor carriers may carry legacy (e.g., LTE Release 8) system information and an additional SIB to point to the anchor carrier. The DL grant on the anchor carrier assigns DL resources on the other DL carriers for which it is defined as an anchor carrier. DL grants on a DL carrier that is not an anchor carrier can assign DL resources for that carrier only. A multicarrier assignment may come as one jointly coded grant on the anchor carrier. The jointly coded grant may carry assignments for any carrier in the multicarrier group. DL/UL control can be transmitted on the legacy control region or on a dedicated/specified additional control space in the legacy data space. The UL grant on the anchor carrier assigns UL resources on the other UL carriers for which it is defined as an anchor carrier. UL assignments across multiple UL carriers could assume joint or independent data coding. UL grants on a DL carrier that is not an anchor carrier can assign only the resources for the UL carrier with which the DL carrier is paired.

The eNodeB 104 includes a scheduler. The scheduler can be independent across carriers or joint across all or a subset of carriers. When the data is jointly coded across multiple carriers, the scheduler is a joint scheduler. A joint scheduler across multiple carriers, even in cases where it is not necessary, could provide better resource utilization. For the DL scheduler, a UE 102 may be scheduled on one or multiple DL carriers. Each UL may carry independently or jointly coded packets in case of OFDMA based UL. For the UL scheduler, a UE 102 could be scheduled on one or multiple UL carriers. Each UL may carry independently coded packets in case of SC-FDMA based UL. Each UL may carry independently or jointly coded packets in case of OFDMA based UL.

Figure 5:
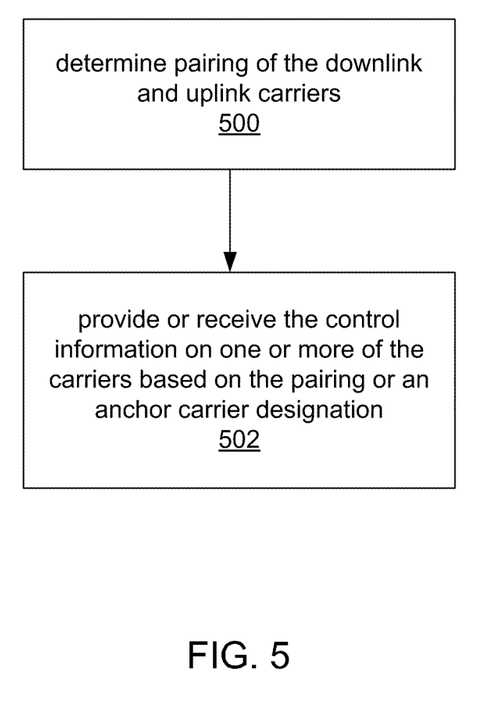
FIG. 5 is a conceptual block diagram illustrating the functionality of an exemplary apparatus.

FIG. 5 is a conceptual block diagram illustrating an exemplary algorithm implemented by the processing system 204. The processing system 204, when implementing the algorithm, provides a means for determining a pairing between one or more UL carriers and one or more DL carriers and a means for exchanging the control information on one or more of the carriers based on the pairing or an anchor carrier designation. The processing system 204 may reside in the eNodeB 104 or the UE 102 and is configured to determine the pairing of the DL and UL carriers (500). When the processing system 204 resides in the UE 102, the UE 102 receives pairing information from the eNodeB 104 and identifies the pairing of the DL and UL carriers from the received pairing information. When the processing system 204 resides in the eNodeB, the processing system 204 decides the pairing of the DL and UL carriers and communicates the pairing to UEs 102 with which the eNodeB 104 is in communication. The communication may be dedicated signaling to individual UEs 102 or may be a system-information broadcast to all the UEs 102. In one configuration, the pairing is between at least one DL carrier and a plurality of UL carriers or between a plurality of DL carriers and at least one UL carrier. Generally, two or more DL carriers may be paired with an UL carrier, two or more UL carriers may be paired with a DL carrier, or a plurality of DL carriers may be paired with a plurality of UL carriers. The processing system 204 determines on which carrier to exchange (i.e., to provide or to receive) control information based on the pairing or whether an anchor carrier has been designated for the carrier. When based on pairing, UL carriers carry control information for DL carriers to which the UL carriers are paired, and DL carriers carry control information for UL carriers to which the DL carriers are paired. When based on a designated anchor carrier, the designated anchor carrier carries the control information for the carriers for which the anchor carrier is designated. The anchor carrier may or may not be within the pairing. After determining which carriers carry the control information, the processing system 204 exchanges (i.e., provides or receives) the control information on one or more of the carriers based on the pairing or an anchor carrier designation (502).

With respect to step 502, when the processing system 204 resides in a UE 102, the UE 102 receives control information in DL on one or more of the carriers based on the pairing or an anchor carrier designation and provides control information in UL on one or more of the carriers based on the pairing or an anchor carrier designation. Similarly, when the processing system 204 resides in an eNodeB 104, the eNodeB 104 receives control information in UL on one or more of the carriers based on the pairing or an anchor carrier designation and provides control information in DL on one or more of the carriers based on the pairing or an anchor carrier designation.

Figure 6:
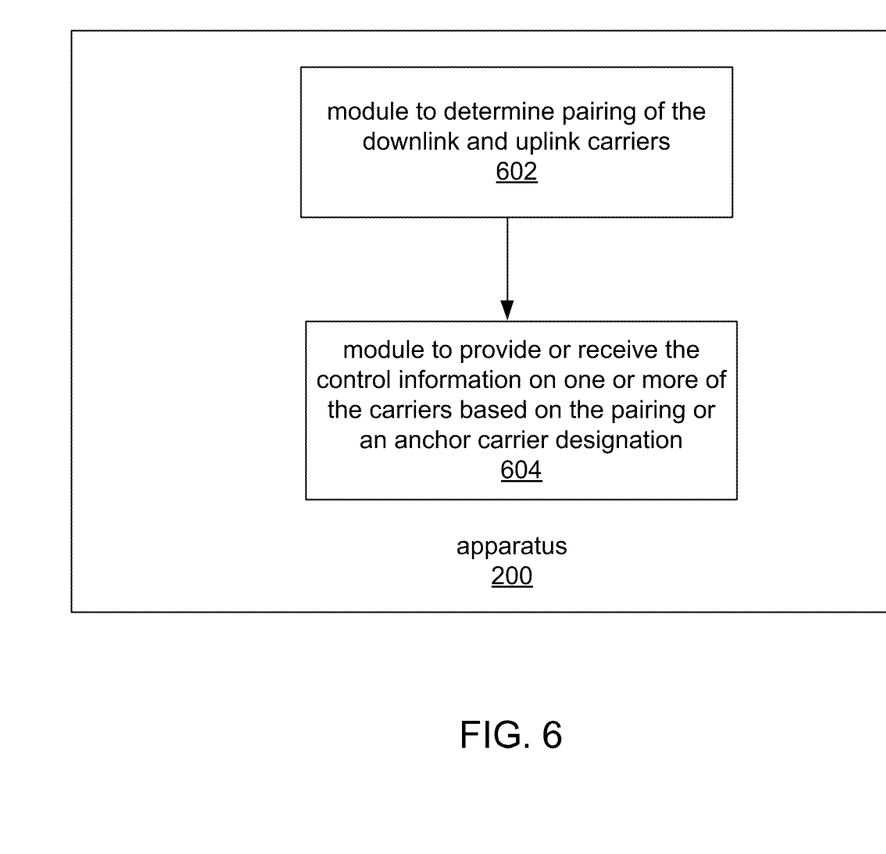
FIG. 6 is a conceptual block diagram illustrating the functionality of an exemplary apparatus.

FIG. 6 is a conceptual block diagram illustrating the functionality of an exemplary apparatus. The apparatus 200 includes a module to determine a pairing of the downlink and uplink carriers (602) and a module to provide or receive the control information on one or more of the carriers based on the pairing or an anchor carrier designation (604). The modules 602 and 604 may be a part of the processing system 204 and/or the wireless interface 202.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method used in a wireless communication system, comprising:
receiving information communicated through radio resource control signaling that indicates a configuration of one or more uplink carriers and one or more downlink carriers, the one or more uplink carriers and the one or more downlink carriers comprising at least three carriers;
using a first paired carrier for exchanging first control information for a first carrier of the one or more uplink carriers and the one or more downlink carriers; and
using, based at least in part on the information communicated through radio resource control signaling, a second paired carrier or a designated anchor carrier for exchanging second control information for a second carrier of the one or more uplink carriers and the one or more downlink carriers,
wherein the first carrier comprises an uplink or downlink carrier of a first carrier pairing and the second carrier comprises an uplink or downlink carrier of a second carrier pairing.

2. The method of claim 1, wherein the second control information comprises downlink control information, wherein using the second paired carrier or the designated anchor carrier comprises using the second paired carrier for exchanging the downlink control information, and wherein the method further comprises using the designated anchor carrier for exchanging uplink control information for the second carrier of the one or more uplink carriers and the one or more downlink carriers.

3. The method of claim 1, wherein the second control information comprises downlink control information, wherein using the second paired carrier or the designated anchor carrier comprises using the designated anchor carrier for exchanging the downlink control information, and wherein the method further comprises using the designated anchor carrier for exchanging uplink control information for the second carrier of the one or more uplink carriers and the one or more downlink carriers.

4. The method of claim 1, wherein the first and second control information each comprises at least one of channel quality indication feedback, hybrid automatic repeat request feedback, downlink grants, or uplink grants.

5. The method of claim 1, wherein the second control information is exchanged within data space of the carriers.

6. The method of claim 1, wherein at least one of the one or more uplink carriers and the one or more downlink carriers have at least one of a disjoint frequency allocation or an asymmetric bandwidth as compared to the other of the one or more uplink carriers and the one or more downlink carriers.

7. The method of claim 1, further comprising:
identifying one or more pairings for all available downlink carriers and uplink carriers based at least in part on the received information communicated through radio resource control signaling, wherein at least one of the available downlink or uplink carriers have at least one of a disjoint frequency allocation or an asymmetric bandwidth as compared to another of the available downlink or uplink carriers.

8. The method of claim 1, further comprising:
determining, for an uplink transmission on the second carrier, a downlink resource for hybrid automatic repeat request feedback, the downlink resource being on a carrier on which a grant for the uplink transmission was sent.

9. An apparatus operable in a wireless communication system, comprising:
means for receiving information communicated through radio resource control signaling that indicates a configuration of one or more uplink carriers and one or more downlink carriers, the one or more uplink carriers and the one or more downlink carriers comprising at least three carriers;
means for using a first paired carrier for exchanging first control information for a first carrier of the one or more uplink carriers and the one or more downlink carriers; and
means for using, based at least in part on the information communicated through radio resource control signaling, a second paired carrier or a designated anchor carrier for exchanging second control information for a second carrier of the one or more uplink carriers and the one or more downlink carriers,
wherein the first carrier comprises an uplink or downlink carrier of a first carrier pairing and the second carrier comprises an uplink carrier or downlink carrier of a second carrier pairing.

10. The apparatus of claim 9, wherein the second control information comprises downlink control information, wherein the means for using the second paired carrier or the designated anchor carrier comprises means for using the second paired carrier for exchanging the downlink control information, and wherein the apparatus further comprises means for using the designated anchor carrier for exchanging uplink control information for the second carrier of the one or more uplink carriers and the one or more downlink carriers.

11. The apparatus of claim 9, wherein the second control information comprises downlink control information, wherein the means for using the second paired carrier or the designated anchor carrier comprises means for using the designated anchor carrier for exchanging the downlink control information, and wherein the apparatus further comprises means for using the designated anchor carrier for exchanging uplink control information for the second carrier of the one or more uplink carriers and the one or more downlink carriers.

12. The apparatus of claim 9, wherein the first and second control information each comprises at least one of channel quality indication feedback, hybrid automatic repeat request feedback, downlink grants, or uplink grants.

13. The apparatus of claim 9, wherein the second control information is exchanged within data space of the carriers.

14. The apparatus of claim 9, wherein at least one of the one or more uplink carriers and the one or more downlink carriers have at least one of a disjoint frequency allocation or an asymmetric bandwidth as compared to the other of the one or more uplink carriers and the one or more downlink carriers.

15. The apparatus of claim 9, further comprising:
means for identifying one or more pairings for all available downlink carriers and uplink carriers based at least in part on the received information communicated through radio resource control signaling, wherein at least one of the available downlink or uplink carriers have at least one of a disjoint frequency allocation or an asymmetric bandwidth as compared to another of the available downlink or uplink carriers.

16. The apparatus of claim 9, further comprising:
means for determining, for an uplink transmission on the second carrier, a downlink resource for hybrid automatic repeat request feedback, the downlink resource being on a carrier on which a grant for the uplink transmission was sent.

17. An apparatus operable in a wireless communication system, comprising:
one or more processors configured to:
receive information communicated through a radio resource control signaling that indicates a configuration of one or more uplink carriers and one or more downlink carriers, the one or more uplink carriers and the one or more downlink carriers comprising at least three carriers;
use, a first paired carrier for exchanging first control information for a first carrier of the one or more uplink carriers and the one or more downlink carriers; and
use, based at least in part on the information communicated through radio resource control signaling, a second paired carrier or a designated anchor carrier for exchanging second control information for a second carrier of the one or more uplink carriers and the one or more downlink carriers,
wherein the first carrier comprises an uplink or downlink carrier of a first carrier pairing and the second carrier comprises an uplink or downlink carrier of a second carrier pairing.

18. The apparatus of claim 17, wherein the second control information comprises downlink control information, wherein using the second paired carrier or the designated anchor carrier comprises using the second paired carrier for exchanging the downlink control information, and wherein the one or more processors are configured to use the designated anchor carrier for exchanging uplink control information for the second carrier of the one or more uplink carriers and the one or more downlink carriers.

19. The apparatus of claim 17, wherein the second control information comprises downlink control information, wherein using the second paired carrier or the designated anchor carrier comprises using the designated anchor carrier for exchanging the downlink control information, and wherein the one or more processors are configured to use the designated anchor carrier for exchanging uplink control information for the second carrier of the one or more uplink carriers and the one or more downlink carriers.

20. The apparatus of claim 17, wherein the first and second control information each comprises at least one of channel quality indication feedback, hybrid automatic repeat request feedback, downlink grants, or uplink grants.

21. The apparatus of claim 17, wherein the second control information is exchanged within data space of the carriers.

22. The apparatus of claim 17, wherein at least one of the one or more uplink carriers and the one or more downlink carriers have at least one of a disjoint frequency allocation or an asymmetric bandwidth as compared to the other of the one or more uplink carriers and the one or more downlink carriers.

23. The apparatus of claim 17, further comprising:
one or more processors configured to:
identify one or more pairings for all available downlink carriers and uplink carriers based at least in part on the received information communicated through radio resource control signaling; and
at least one of the available downlink or uplink carriers have at least one of a disjoint frequency allocation or an asymmetric bandwidth as compared to another of the available downlink or uplink carriers.

24. The apparatus of claim 17, wherein the one or more processors are further configured to:
determine, for an uplink transmission on the second carrier, a downlink resource for hybrid automatic repeat request feedback, the downlink resource being on a carrier on which a grant for the uplink transmission was sent.

25. A computer program product comprising
a non-transitory computer-readable medium, the non-transitory computer-readable medium comprising:
code for receiving information communicated through radio resource control signaling that indicates a configuration of one or more uplink carriers and one or more downlink carriers, the one or more uplink carriers and the one or more downlink carriers comprising at least three carriers;
code for using a first paired carrier for exchanging first control information for a first carrier of the one or more uplink carriers and the one or more downlink carriers; and
code for using, based at least in part on the information communicated through radio resource control signaling, a second paired carrier or a designated anchor carrier for exchanging second control information for a second carrier of the one or more uplink carriers and the one or more downlink carriers,
wherein the first carrier comprises an uplink or downlink carrier of a first carrier pairing and the second carrier comprises an uplink or downlink carrier of a second carrier pairing.

26. The computer program product of claim 25, wherein the second control information comprises downlink control information, wherein using the second paired carrier or the designated anchor carrier comprises using the second paired carrier for exchanging the downlink control information, and wherein the non-transitory computer-readable medium further comprises code for using the designated anchor carrier for exchanging uplink control information for the second carrier of the one or more uplink carriers and the one or more downlink carriers.

27. The computer program product of claim 25, wherein the second control information comprises downlink control information, wherein using the second paired carrier or the designated anchor carrier comprises using the designated anchor carrier for exchanging the downlink control information, and wherein the non-transitory computer-readable medium comprises code for using the designated anchor carrier for exchanging uplink control information for the second carrier of the one or more uplink carriers and the one or more downlink carriers.

28. The computer program product of claim 25, wherein the first and second control information each comprises at least one of channel quality indication feedback, hybrid automatic repeat request feedback, downlink grants, or uplink grants.

29. The computer program product of claim 25, wherein the second control information is exchanged within data space of the carriers.

30. The computer program product of claim 25, wherein at least one of the one or more uplink carriers and the one or more downlink carriers have at least one of a disjoint frequency allocation or an asymmetric bandwidth as compared to the other of the one or more uplink carriers and the one or more downlink carriers.

31. The computer program product of claim 25, further comprising:
code for identifying one or more pairings for all available downlink carriers and uplink carriers based at least in part on the received information communicated through radio resource control signaling, wherein at least one of the available downlink or uplink carriers have at least one of a disjoint frequency allocation or an asymmetric bandwidth as compared to another of the available downlink or uplink carriers.

32. The computer program product of claim 25, wherein the non-transitory computer-readable medium further comprises:
code for determining, for an uplink transmission on the second carrier, a downlink resource for hybrid automatic repeat request feedback, the downlink resource being on a carrier on which a grant for the uplink transmission was sent.

* * * * *